Feb. 14, 1950     G. L. HILDEBRAND     2,497,083
HYDRAULIC SAFETY DEVICE
Filed May 21, 1945

Inventor
GEORGE L. HILDEBRAND
By Ralph L. Chappell
Attorney

Patented Feb. 14, 1950

2,497,083

UNITED STATES PATENT OFFICE 2,497,083

HYDRAULIC SAFETY DEVICE

George L. Hildebrand, United States Navy

Application May 21, 1945, Serial No. 594,879

1 Claim. (Cl. 188—94)

(Granted under the act of March 3, 1883, as amended April 30, 1928; 370 O. G. 757)

This invention relates to safety devices, and more particularly to a new and improved cargo boom check for use aboard ship, at docks, wharves and the like.

In handling cumbersome and heavy cargo aboard ship, it has heretofore been the practice to employ cargo booms, deck cranes, davits and the like which are frequently operated through block and tackle means and through hand and power operated winches.

In the operation of these devices there is considerable occupational hazard incident to the raising and lowering of the cargo booms, etc., as structural failure at any one of several important points may permit the boom and its cargo to crash to the deck.

It is an object of the present invention to provide a new and improved fluid operated safety device for controlling abnormal acceleration of movement of bodies such as cargo booms and similar load carrying devices wherein the device will take over the load in the event of abnormal acceleration resulting from a structural failure of any of the load-bearing mechanism.

It is a further object of the present invention to provide automatic means for gradually checking any abrupt downward movement of a cargo boom which may be occasioned.

Still another object of the present invention is to provide controllable means for rendering the safety device aforesaid inoperative when desired, so that necessary adjustments and boom positioning may be carried out.

A further object of the present invention is to provide a foolproof simple safety device which will be practical and may readily be used under difficult conditions with a minimum of skill and attention from the operator and which will endure continued exposure to the elements without interfering with the proper operation thereof.

Figure 1:
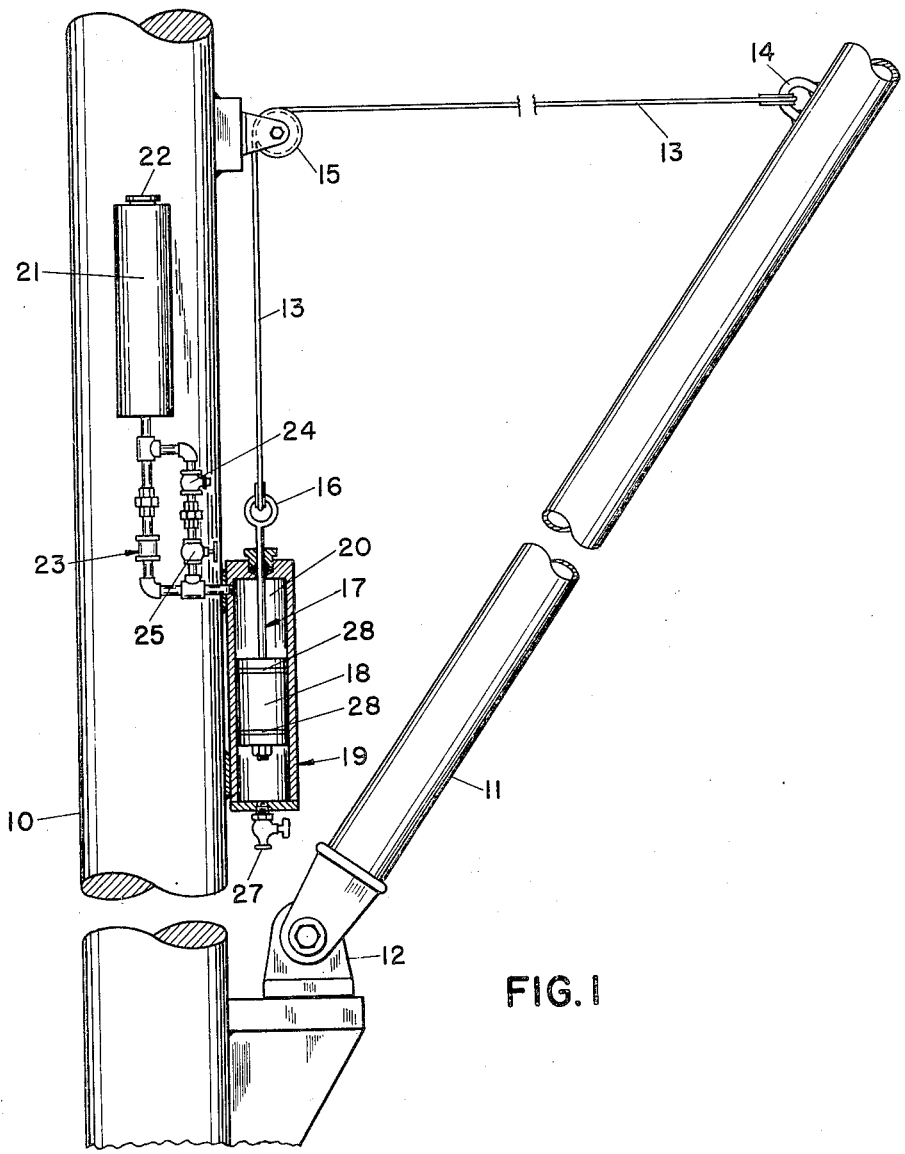

For a more complete understanding of the invention and for other objects and advantages thereof, reference should now be had to the following description in connection with the accompanying drawing, in which Fig. 1 is a side elevation partially in section of the device of the present invention shown installed for use.

Figure 2:
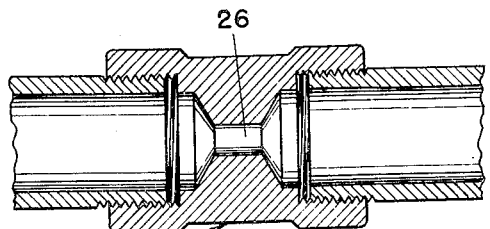

Fig. 2 is a longitudinal section through a fluid restriction fitting or jet forming a part of the embodiment illustrated in Fig. 1.

Referring to the drawings in detail, one embodiment of the present invention is illustrated in Fig. 1, wherein it is shown installed upon a base such as an upright mast 10 having an outwardly extending boom 11 pivoted thereto through suitable fittings 12 at the lower end of the boom. This boom may be raised and lowered by means of suitable block and tackle apparatus (not shown) connecting the upper ends of the mast and the boom in the manner customary in the maritime service. It will be obvious that a structural failure of the connection between the upright mast 10 and the outer end of the boom 11 or at any other important point would permit the boom, together with its heavy load, to crash to the deck.

In order to prevent such an accident, the present invention may be installed in the manner indicated in Fig. 1 wherein a safety line 13 is shown with one end secured to a body such as the boom 11 by any suitable means such as the bracket 14 illustrated. This line passes inboard and over the sheave of a heavy duty block 15 secured to the mast 10 and the lower end of the line engages in the eye 16 of a piston rod 17 having a vertically movable piston 18 at its opposite end. This piston 18 is adapted for vertical movement within the bore of a vertically disposed operating cylinder 19 as illustrated.

The hydraulic portion of the present device includes the piston 18 aforesaid and the space 20 above the piston which is kept filled with a suitable hydraulic fluid such as oil, controlled by the fittings hereinafter described.

A hydraulic fluid supply tank 21 having a filler cap 22 provides a reservoir of hydraulic fluid which is free to pass downwardly through the assembled fittings shown into the space 20 above the piston 18. These fittings are arranged to provide two passages, one having a fluid flow restricting jet 23 (shown in detail in Fig. 2), and the other forming a by-pass for the jet and including a check valve 24 of conventional construction, and a hand-operated globe type by-pass valve 25. All these fittings may be assembled by means of suitable angles, T joints, couplings and unions in the manner shown.

In operation, the boom or other member being controlled is usually first positioned for operation and is ordinarily thereafter retained in the adjusted position while being used. To permit the initial adjustment or positioning by-pass valve 25 may be manually opened or may be operated through some remote control mechanism or linkage as is well known in the art, so that the fluid from the upper portion of the cylinder 20 may pass freely to or from the supply reservoir 21 as the piston 18 is raised or lowered during its adjustment. The check valve 24 may be installed so as to control fluid flow in either direction as desired when the by-pass valve 25 is open and piston 18 is raised or lowered. When the boom is adjusted to the desired position, the by-pass valve 25 may be closed and thereafter any fluid pressure which may be caused by movement of piston 18 must be relieved through the restricted orifice of jet 23.

It will be obvious that with the by-pass valve 25 closed, any structural failure which permits the boom 11 to drop will immediately impose a strain upon line 13, raising the piston 18 and tending forcefully to expel the hydraulic fluid under pressure through the restricted orifice 26. Variation in the size of the opening 26 in the jet 23 will obviously vary the rate with which hydraulic fluid can pass therethrough and back into the reservoir 21. Suitable protected vent means may be provided for the reservoir 21, and if desired may be incorporated in the filler cap 22. Likewise a pet cock 27 is shown installed in the base of the working cylinder 19 and may be opened during adjustment of the piston 18 or for the purpose of draining the space within the cylinder 19 and below piston 18. The piston 18 may be provided with suitable oil-sealing means such as the rings 28 shown.

While I have shown a particular embodiment of my invention, it will be understood, of course, that I do not wish to be limited thereto since many modifications may be made, and I, therefore, contemplate by the appended claim to cover any such modifications as fall within the true spirit and scope of my invention.

The invention described herein may be manufactured and used by or for the Government of the United States of America for governmental purposes without the payment of any royalties thereon or therefor.

What is claimed is:

In combination in hydraulic apparatus for controlling abnormal acceleration of movement of a body; a base; a hydraulic cylinder vertically mounted thereon; a piston arranged for vertically reciprocating travel in said cylinder; a piston rod projecting in operating position out of the top of said cylinder; means connecting said rod and said body; a vented reservoir constructed and arranged above said cylinder; a main conduit arranged to maintain the delivery fluid from said reservoir into a space above said piston in said cylinder; a by-pass conduit circumventing a portion of said main conduit; a by-pass valve for opening and closing said by-pass conduit; a check valve in said by-pass conduit arranged to check flow therethrough in one direction when said by-pass valve is in its open position; and a flow-restricting jet positioned in said portion of said main conduit and arranged and constructed in cooperating relationship with said cylinder to automatically check abnormal acceleration of said movement when said by-pass valve is in its closed position.

GEORGE L. HILDEBRAND.

REFERENCES CITED

The following references are of record in the file of this patent:

UNITED STATES PATENTS

| Number | Name | Date |
|---|---|---|
| 411,681 | Ridgway | Sept. 24, 1889 |
| 545,589 | Kilgore | Sept. 3, 1895 |
| 2,001,988 | Temple | May 21, 1935 |
| 2,282,652 | Henning | May 12, 1942 |

FOREIGN PATENTS

| Number | Country | Date |
|---|---|---|
| 19,386 | Great Britain | Sept. 4, 1902 |